(12) United States Patent
Broberg, III et al.

(10) Patent No.: US 6,453,366 B1
(45) Date of Patent: Sep. 17, 2002

(54) METHOD AND APPARATUS FOR DIRECT MEMORY ACCESS (DMA) WITH DATAFLOW BLOCKING FOR USERS

(75) Inventors: Robert Neal Carlton Broberg, III, Rochester; Jonathan William Byrn, Kasson; Chad B. McBride; Gary Paul McClannahan, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/251,043

(22) Filed: Feb. 18, 1999

(51) Int. Cl.[7] ............................................. G06F 13/28
(52) U.S. Cl. ........................................ 710/26; 710/28
(58) Field of Search ..................................... 710/22–28

(56) References Cited

U.S. PATENT DOCUMENTS 5,448,714 A * 9/1995 Stodieck
5,829,043 A * 10/1998 Gillet et al. ................. 711/154
5,854,640 A * 12/1998 North et al. ................. 345/515
6,154,793 A * 11/2000 MacKenna et al. ........... 710/23
6,166,748 A * 12/2000 Van Hook et al. ........... 345/522

* cited by examiner

*Primary Examiner*—Matthew Kim
*Assistant Examiner*—Pierre M. Vital
(74) *Attorney, Agent, or Firm*—Joan Pennington

(57) ABSTRACT

A method and apparatus are provided for implementing direct memory access (DMA) with dataflow blocking for users for processing data communications in a communications system. A DMA starting address register receives an initial DMA starting address and a DMA length register receives an initial DMA length. A DMA state machine receives a control input for starting the DMA. The DMA state machine updates the DMA starting address to provide a current DMA starting address. The DMA state machine loads a DMA ending address. A DMA blocking logic receives the current DMA starting address and the DMA ending address and blocks received memory requests only within a current active DMA region.

12 Claims, 6 Drawing Sheets

US 6,453,366 B1

METHOD AND APPARATUS FOR DIRECT MEMORY ACCESS (DMA) WITH DATAFLOW BLOCKING FOR USERS

FIELD OF THE INVENTION

The present invention relates generally to the data processing field, and more particularly, relates to a method and apparatus for direct memory access (DMA) with dataflow blocking for users.

DESCRIPTION OF THE RELATED ART

Asynchronous Transfer Mode or ATM is a communication technology whose use is becoming more widespread in some areas while receiving competition from Gigabit Ethernet and Packet Over SONET (POS) in other areas. When the above environments are combined in a single adapter, problems result. In a communications adapter that supports a Packet over SONET physical bus called POS-PHY both cell based protocols and packet based protocols are supported. In addition to both types of protocols, multiple physicals are attached to the bus. Also multiple cell sizes are supported. In this environment, it is necessary to implement direct memory accesses (DMAs) for multiple connections to complete receive and transmit functions in a variety of operational modes.

SUMMARY OF THE INVENTION

A principal object of the present invention is to provide a method and apparatus for direct memory access (DMA) with dataflow blocking for users. Other important objects of the present invention are to provide such method and apparatus for direct memory access (DMA) with dataflow blocking for users substantially without negative effects and that overcome many disadvantages of prior art arrangements.

In brief, a method and apparatus are provided for implementing direct memory access (DMA) with dataflow blocking for users for processing data communications in a communications system. A DMA starting address register receives an initial DMA starting address and a DMA length register receives an initial DMA length. A DMA state machine receives a control input for starting the DMA. The DMA state machine updates the DMA starting address to provide a current DMA starting address. The DMA state machine loads a DMA ending address. A DMA blocking logic receives the current DMA starting address and the DMA ending address and blocks received memory requests only within a current active DMA region.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
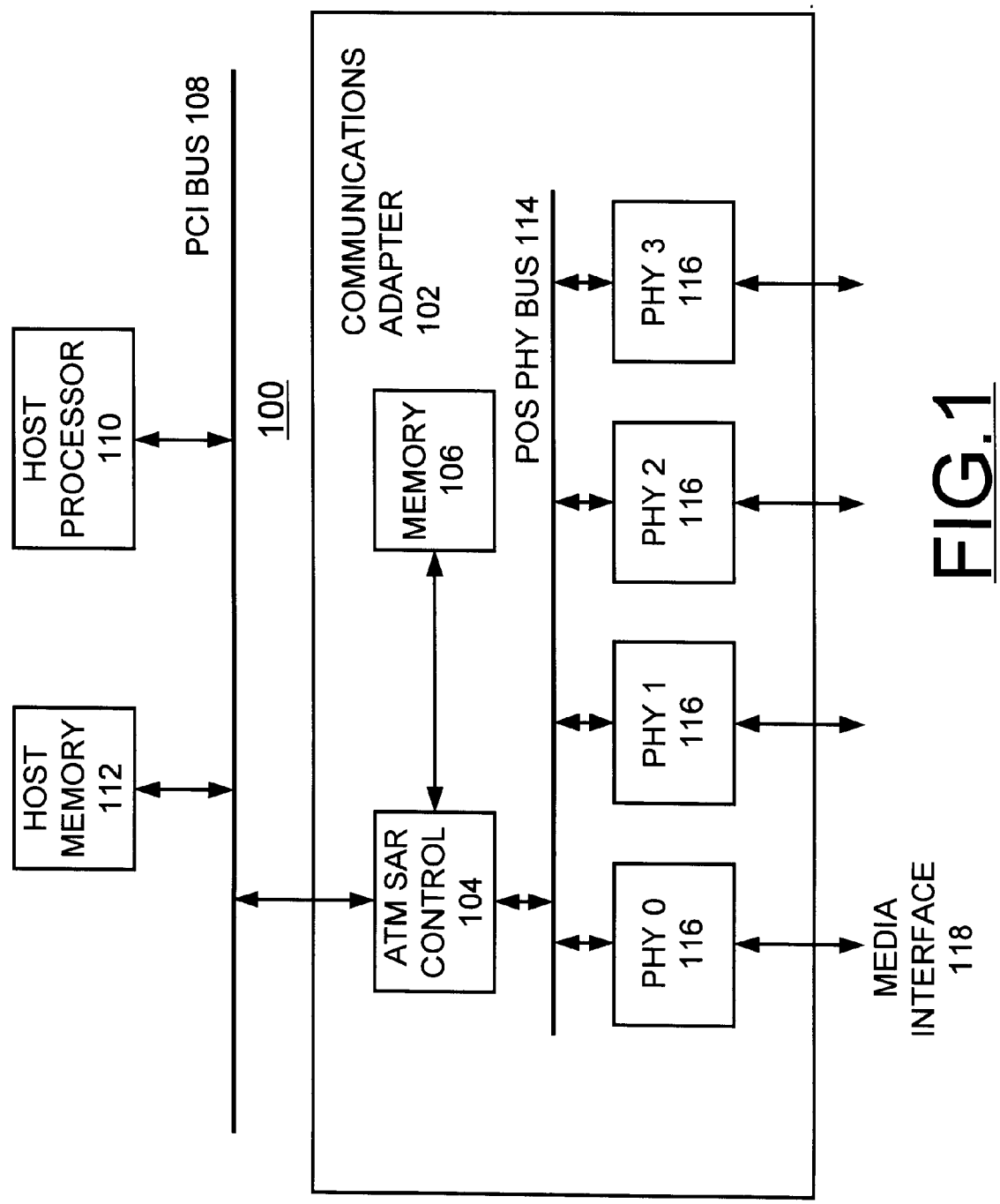
FIG. 1 is a block diagram representation illustrating a communications adapter of the preferred embodiment.

Having reference now to the drawings in FIG. 1, there is shown a communications system generally designated by 100 including a communications adapter generally designated by 102 and arranged in accordance with the preferred embodiment. As shown in FIG. 1, adapter 102 includes an ATM segmentation and reassembly control 104 coupled to a local memory 106. As shown, the ATM SAR control 104 is connected to a peripheral component interconnect (PCI) bus 108 coupled to a host processor 110 and a host memory 112. The ATM SAR control 104 is connected by a packet over SONET (POS) physical bus 114 to a plurality of physical (PHY) layer 116. Each of the multiple physical layers 116 is connected to a respective media interface 118. Adapter 102 provides interface and translator functions between the PHY layers 116 and the peripheral component interconnect (PCI) bus 108. Adapter 102 is illustrated in simplified form sufficient for an understanding of the present invention.

Figure 2:
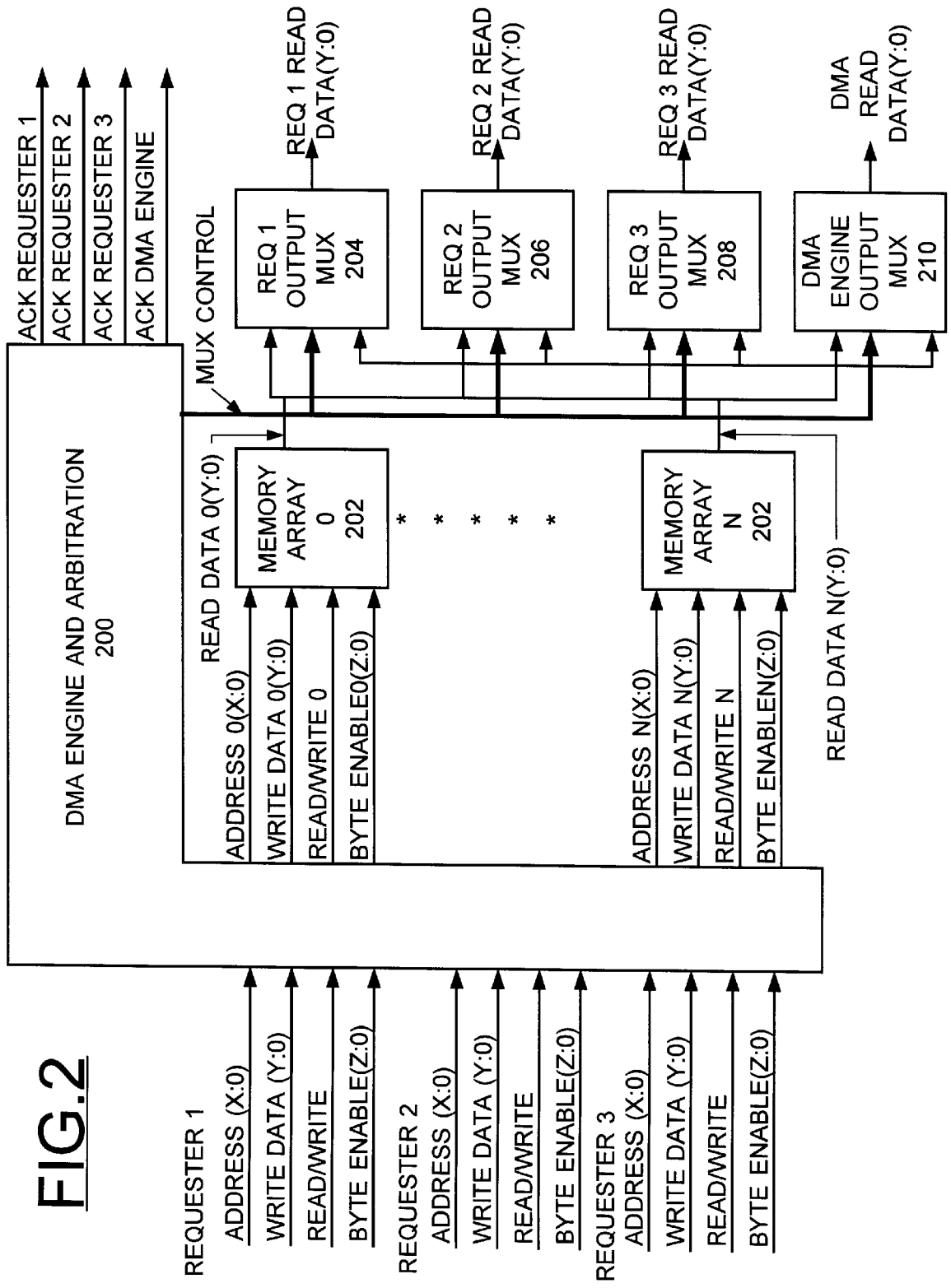
FIG. 2 is a block diagram representation illustrating apparatus for direct memory access (DMA) with dataflow blocking for users of the preferred embodiment.

FIG. 2 illustrates apparatus for direct memory access (DMA) with dataflow blocking for users of the preferred embodiment including a DMA engine and arbitration unit 200. As shown in FIG. 2, a plurality of requesters 1–3 provide requests indicated at lines ADDRESS (X:0), WRITE DATA (Y:0), READ/WRITE and BYTE ENABLE (Z:0) to the DMA engine and arbitration unit 200. DMA engine and arbitration unit 200 respectively couples requests indicated at lines ADDRESS 0(X:0), WRITE DATA 0(Y:0), READ/WRITE 0 and BYTE ENABLE 0(Z:0) through ADDRESS N(X:0), WRITE DATA N(Y:0), READ/WRITE N and BYTE ENABLE N(Z:0) to a plurality of memory arrays (0–N) 202. READ DATA 0(Y:0) through READ DATA N(Y:0) is applied respectively to a first requester output multiplexer 204, a second requester output multiplexer 206, a third requester output multiplexer 208, and a DMA engine output multiplexer 210. DMA engine and arbitration unit 200 provides a multiplexer control to the multiplexers 204, 206, 208 and 210. DMA engine and arbitration unit 200 provides multiple acknowledge outputs indicated at lines ACK REQUESTER 1, ACK REQUESTER 2, ACK REQUESTER 3, ACK DMA ENGINE. While three requesters are shown in FIG. 2, it should be understood that there can be an arbitrary number of requesters.

In accordance with features of the invention, a DMA engine 200 blocks other memory requesters only from an active or uncompleted region being DMAed to or from. Typically a processor starts a direct memory access (DMA) and waits for a status bit to indicate that the DMA is complete before entering the memory region involved in the DMA. An important advantage of the invention is that a memory requester is allowed to begin processing portions of the DMA space before the DMA completes. For example, when DMAing in a large data structure, processing begins with the early portions of the large data structure while waiting for the later portions to arrive in memory.

Figure 3:
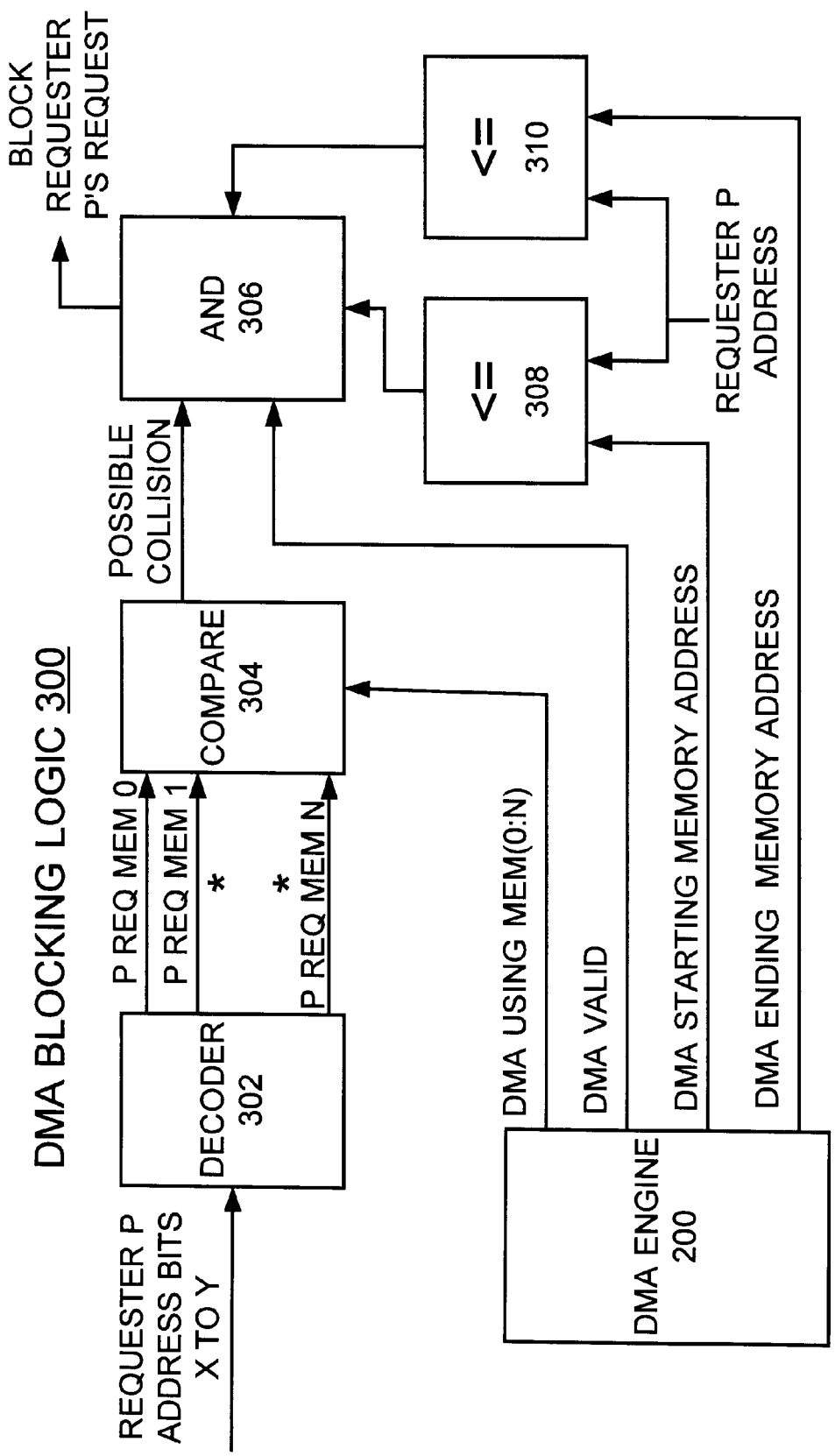
FIGS. 3, 4, and 5 are block diagram representations illustrating apparatus for direct memory access (DMA) with dataflow blocking for users of the preferred embodiment.

Referring to FIG. 3, there is shown DMA blocking logic 300 of the preferred embodiment. DMA blocking logic 300 includes a decoder 302 receiving a requester P address bits X to Y. Decoder 302 provides outputs P REQUEST MEM 0–N that are applied to a compare 304. DMA engine 200 provides an output DMA USING MEM (0–N) that is applied to the compare 304. Compare 304 checks for any corresponding P REQ MEM and DMA USING MEM bits that are on and outputs a 1 if true at a line labeled POSSIBLE COLLISION. The POSSIBLE COLLISION output of compare 304 is applied to an AND gate 306. DMA engine 200 provides an output DMA VALID to AND gate 306. DMA engine 200 provides an output DMA Starting Memory Address that is compared with the Requester P Address by a less than or equal <=compare 308. Compare 308 outputs a 1 if the DMA Starting Memory Address is less than or equal to the Requester P Address. DMA engine 200 provides an output DMA Ending Memory Address that is compared with the Requester P Address by a less than or equal <=compare 310. Compare 310 outputs a 1 if the Requester P Address is less than or equal to the DMA Ending Memory Address. The outputs of compares 308 and 310 are applied to AND gate 306 and ANDed together with the DMA VALID and POSSIBLE COLLISION inputs. If memory requester P requests an address that is currently within the active region, between the current start to end address of the DMA, its request is blocked until the DMA Starting Address advances past the address being requested. The output of AND gate 306 labeled BLOCK REQUESTER P's REQUEST is used to block memory requester p request only from an active or uncompleted region of a current DMA operation.

Figure 4:
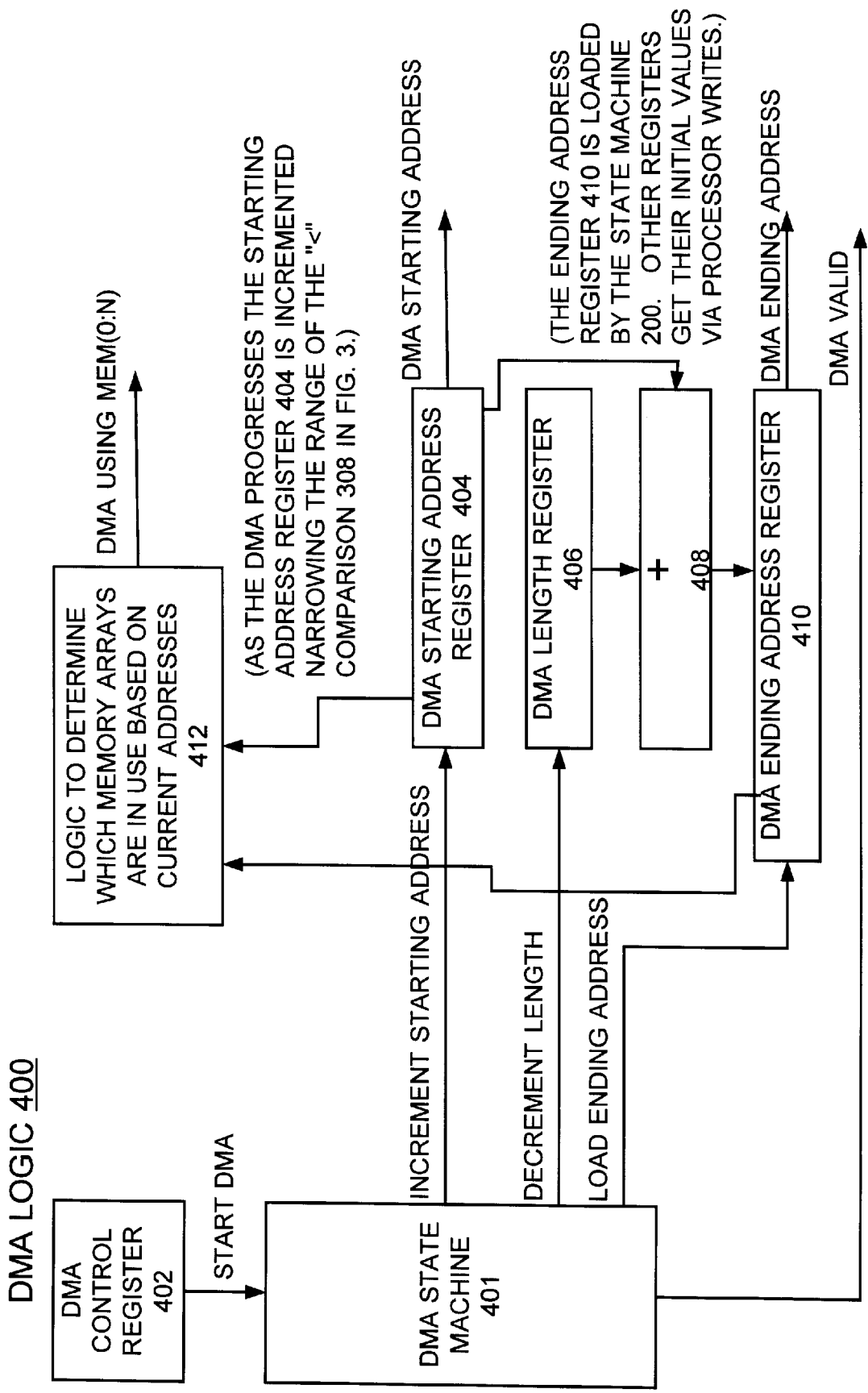

Referring to FIG. 4, there is shown DMA logic 400 of the preferred embodiment. DMA logic 400 includes a DMA state machine 401 receiving a start DMA input from a DMA control register 402. DMA logic 400 includes a DMA Starting Address register 404 and a DMA length register 406. The DMA Starting Address register 404 and DMA length register 406 are loaded with their initial values responsive to the user requests. The DMA Starting Address and DMA length are added by an adder 408 to provide a DMA Ending Address register 410. The starting and ending addresses of the DMA are tracked by DMA state machine 401. As the DMA advances, the starting address and DMA length values are updated by an increment starting address and decrement length outputs of the DMA state machine 401 applied to the DMA starting address and DMA length. registers 404 and 406. As the DMA progresses, since the DMA Starting Address is incremented, the range of the less than compare 308 in FIG. 3 is decreased. The DMA Ending Address register 410 is loaded by the DMA state machine 401. DMA state machine 401 provides the DMA valid output while the DMA is active. DMA logic 400 includes a logic block 412 used to determine which memory arrays are in use based on the current DMA Starting Address and the DMA Ending Address respectively applied from registers 404 and 410. Logic block 412 provides the output DMA USING MEM(0:N). The output DMA USING MEM(0:N) is applied to compare 304 in FIG. 3 to identify possible collisions with corresponding requested memory arrays.

In operation, the DMA region is then defined by the DMA Starting Address register 404 and the DMA Ending Address register 410. As the DMA progresses, the starting address register is incremented and the DMA region shrinks. Comparators 308, 310 of FIG. 3 checks the address of each incoming memory requester to determine if the address is within the currently active DMA region. If so, the access is blocked. When the DMA progresses past the point of a particular requester's address, the block is removed and the requester is allowed to access memory.

Figure 5:
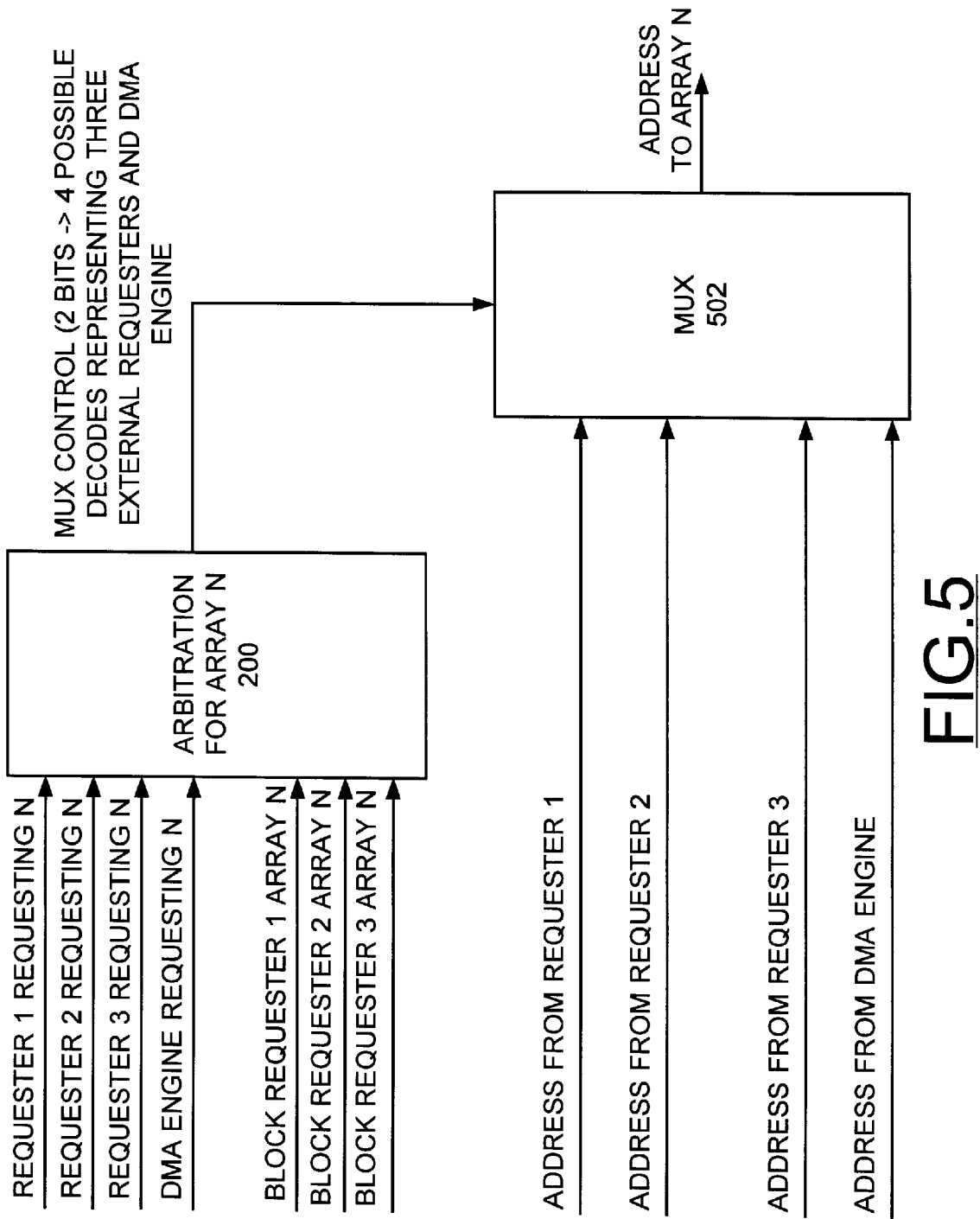

FIG. 5 illustrates an example operation of DMA engine and arbitration unit 200 with arbitration for a memory array N. Each of the requesters 1–3 and DMA engine 200 are requesting array N. Block requesters 1–3 request for Array N inputs are shown applied to the arbitration unit 200. The multiplexer control includes, for example 2-bits providing four possible decodes respectively representing three external requester and the DMA engine 301. A multiplexer 502 receiving an address from the requesters 1–3 and DMA engine 200 provides an address to array N responsive to the applied multiplexer control.

Figure 6:
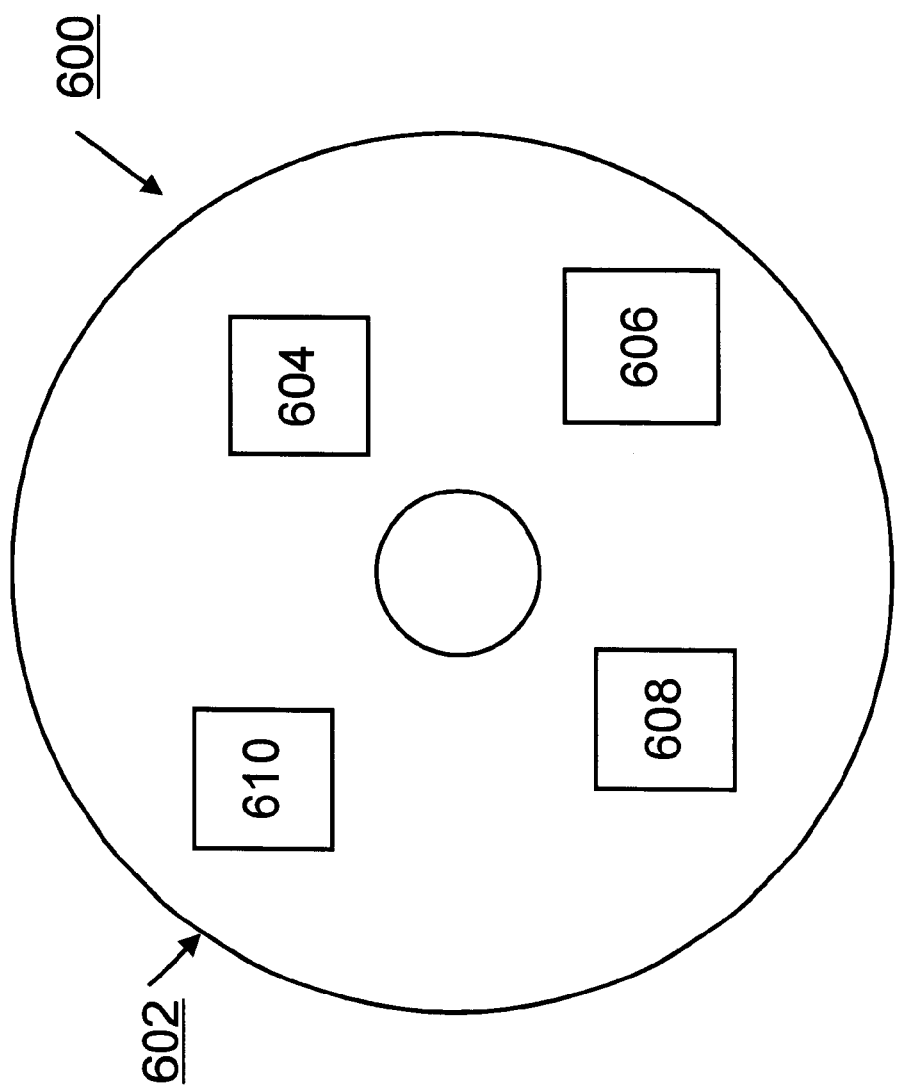
FIG. 6 is a block diagram illustrating a computer program product in accordance with the invention.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the DMA methods of the preferred embodiment.

A sequence of program instructions or a logical assembly of one or more interrelated modules defined by the recorded program means 604, 606, 608, 610, direct adapter 102 for carrying out DMA functions of the preferred embodiment.

While the present invention has been described with reference to the details of the embodiments of the invention shown in the drawing, these details are not intended to limit the scope of the invention as claimed in the appended claims.

What is claimed is:

1. Apparatus for implementing direct memory access (DMA) for processing data communications in a communications system comprising:

a DMA starting address register receiving an initial DMA starting address;

a DMA length register receiving an initial DMA length;

a DMA state machine receiving a control input for starting the DMA;

said DMA state machine loading a DMA ending address; said DMA state machine updating said DMA starting address in said DMA starting address register to provide a current DMA starting address as the DMA advances; and DMA blocking logic receiving said current DMA starting address and said DMA ending address and blocking received user memory requests only within a current active DMA region; said DMA block logic updating said current active DMA region responsive to said current DMA starting address; said current active DMA region decreases as the DMA advances.

2. Apparatus for implementing direct memory access (DMA) as recited in claim 1 wherein said current active DMA region is between said current DMA starting address and said DMA ending address.

3. Apparatus for implementing direct memory access (DMA) as recited in claim 1 wherein said DMA blocking logic includes a first comparator comparing said current DMA starting address and an address for each said received memory request.

4. Apparatus for implementing direct memory access (DMA) as recited in claim 3 wherein said DMA blocking logic includes a second comparator comparing said DMA ending address and said address for each said received memory request.

5. Apparatus for implementing direct memory access (DMA) as recited in claim 4 includes an AND gate for ANDing together an output of said first comparator and an output of said second comparator; said AND gate providing a user memory request blocking signal.

6. Apparatus for implementing direct memory access (DMA) as recited in claim 1 wherein said DMA blocking logic includes a comparator comparing memory arrays in use for said DMA and requested memory arrays for said received user memory requests to identify a possible collision.

7. Apparatus for implementing direct memory access (DMA) as recited in claim 1 wherein said wherein said DMA blocking logic includes a DMA valid signal.

8. A method for implementing direct memory access (DMA) for processing data communications in a communications system comprising the steps of:

starting a direct memory access (DMA);

identifying an active region for the current DMA;

updating said active region for the current DMA as said DMA advances to identify a current active region for the current DMA; said current active region decreasing as said DMA advances;

receiving a user memory request;

comparing said user memory request with said current active region for the current DMA; and blocking said user memory request responsive to said user memory request being within said current active region for the current DMA.

9. A method for implementing direct memory access (DMA) as recited in claim 8 wherein the step of identifying said current active region for the current DMA includes the steps of identifying an initial starting address and updating said starting address as said DMA advances to identify a current starting address and identifying a DMA ending address; and said current starting address and said DMA ending address defining said current active region.

10. A method for implementing direct memory access (DMA) as recited in claim 8 wherein the step of blocking said user memory request responsive to said user memory request being within said current active region for the current DMA includes the step of blocking said user memory request responsive to said user memory request being within said current active region for the current DMA; and said current active region for the current DMA decreasing as said DMA advances.

11. A method for implementing direct memory access (DMA) as recited in claim 8 includes the step of processing each said user memory request, responsive to said user memory request being outside said active region for the current DMA.

12. A computer program product for implementing direct memory access (DMA) for processing data communications in a communications system comprising:

a recording medium;

means, recorded on said recording medium, for identifying a current active region for a current DMA; said current active region for the current DMA decreasing as said DMA advances;

means, recorded on said recording medium, for receiving a user memory request;

means, recorded on said recording medium, for comparing said user memory request with said current active region for the current DMA; and for blocking said user memory request responsive to said user memory request being within said current active region for the current DMA; and for processing each said user memory request, responsive to said user memory request being outside said current active region for the current DMA.

\* \* \* \* \*